Oct. 10, 1967   A. PLUCHINO   3,346,026
ROUTER GUIDE ATTACHMENT
Filed July 12, 1965
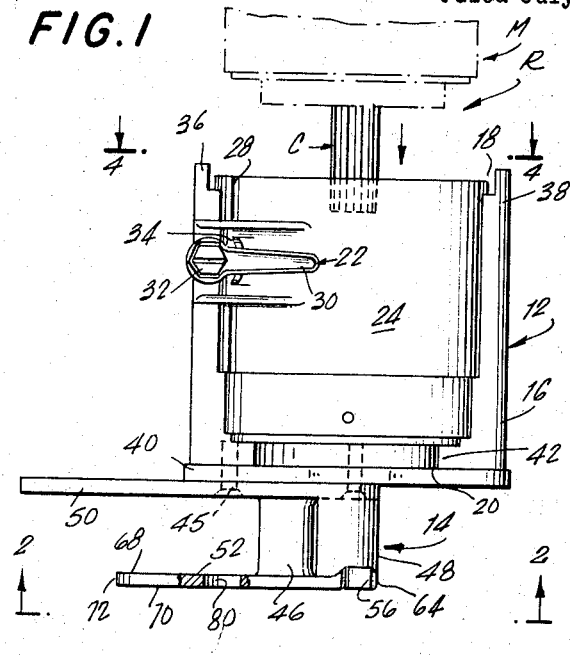
FIG. 1
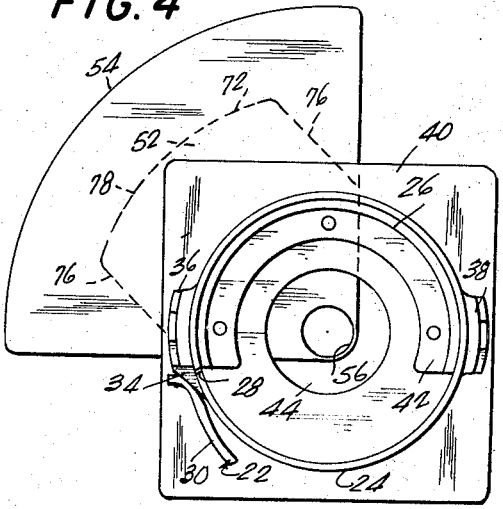
FIG. 4
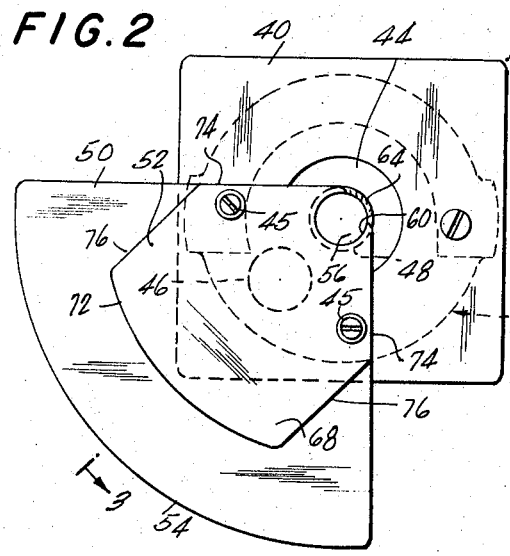
FIG. 2
FIG. 5
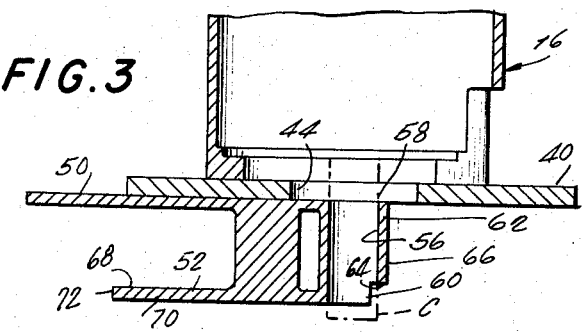
FIG. 3
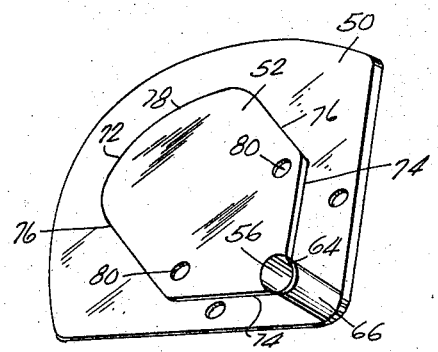
FIG. 6
INVENTOR.
ANTHONY PLUCHINO
BY Amster & Rothstein
ATTORNEYS United States Patent Office 3,346,026
Patented Oct. 10, 1967

3,346,026
ROUTER GUIDE ATTACHMENT
Anthony Pluchino, P.O. Box 496, Pine Bush, N.Y. 12555
Filed July 12, 1965, Ser. No. 471,352
7 Claims. (Cl. 144—144)

The present invention relates generally to an attachment device for use with power operated routers, and in particular to a guide attachment for guiding the cutting tool of a router along the outer periphery of a raised template which is placed in a position coextensive with a cutting surface.

In the commercial manufacture of furniture as well as the construction of woodwork articles by individual hobbyists, it is customary to use a conventional type of router which generally consists of a motor that is vertically mounted with respect to a horizontal cutting surface by means of a base mount that surrounds a cutting tool which is operatively connected to the motor. The conventional types of router base mounts are generally provided with a flat bottom surface for sliding along the cutting surface. Since the flat bottom surface of the base mount surrounds the cutting tool, it is extremely difficult to accurately guide the cutting tool along the periphery of a raised template, stencil or pattern which is provided for cutting a given configuration on the cutting surface being worked. It is important to note that when following the configuration of the raised template it is necessary to maintain the router base flush with the cutting surface. Thus, when using a conventional router base that surrounds the cutting tool, it is not possible to bring the cutting tool into close proximity with the periphery of the raised template while still maintaining the guide attachment in a position that is flush with the cutting surface. Accordingly, a guide attachment has been developed for use with a power operated router to work a substantially flat cutting surface in close proximity to the outer periphery of a raised template which is placed in a position coextensive with the cutting surface. This is accomplished by providing a guide attachment with a radial sectored guide means, such that the cutting tool can be brought in close proximity to the template during the operation of the router.

Broadly, it is an object of the present invention to provide an improved guide attachment for use with a power operated router. Specifically, it is within the contemplation of the present invention to provide a router attachment which is capable of use over prolonged periods of time, and which can be operated along a raised template with a minimum degree of skill on the part of the operator.

In accordance with an illustrative embodiment demonstrating objects and features of the present invention there is provided a guide attachment for use with a power operated router for working a substantially flat cutting surface along the periphery of a raised template which is placed in a position coextensive with the cutting surface. The router includes a motor mounted on a base, and a rotary cutting tool is operatively connected to the motor. Clamping means are provided on the base for detachably securing the motor in a vertical position with respect to the cutting surface. The guide attachment comprises radial sectored guide means which axially surrounds a portion of the cutting tool for sliding along the cutting surface and bringing the cutting tool in close proximity to the outer peripheral edge of the raised template.

The above brief description as well as further objects, features and advantages of the present invention will be more fully appreciated by reference to the following detailed description of a presently preferred, but nonetheless illustrative embodiment, in accordance with the present invention, when taken in conjunction with the accompanying drawings wherein:

FIG. 1 is an elevational view of a guide attachment embodying features of the present invention, with the lower portion of a router being shown broken-away and positioned for mounting on a router base;

FIG. 2 is a bottom plan view of the guide attachment and router base shown in FIG. 1;

FIG. 3 is a sectional view taken substantially along the line 3—3 of FIG. 2 and looking in the direction of the arrows;

FIG. 4 is a top plan view of the guide attachment and router base shown in FIG. 1;

FIG. 5 is a perspective view of portions of a guide attachment and router shown positioned on a cutting surface for following along the pattern of a raised template, with portions being broken away and sectioned; and FIG. 6 is a perspective view of the guide attachment, shown removed from the router base.

Referring now to the drawings, and in particular to FIG. 1, there is shown a router unit R having a motor housing M, which is operatively connected to a cutting tool C. By progressively inspecting FIGS. 1 and 5, the router motor M can be seen as it is mounted in its operating position on a router base 12. In accordance with the invention, a segmented guide attachment 14 is mounted on the router base 12 for working an article of material A, having a substantially flat cutting surface S, along the outer periphery of edge P of a raised template T.

As routers are conventional and well known in the woodworking art a brief description of the router R will suffice. Accordingly, the router R includes a fractional horsepower motor which is mounted on the motor housing M, with the cutting tool C projecting out from the bottom of motor housing M. The same purpose which is generally achieved by a router motor could also be obtained by using a conventional power operated, portable hand-drill. The guide attachment 14 of the instant invention is particularly well suited for use with portable electric drills, particularly in view of the gripping means which has been provided, as opposed to the handles or knobs which are generally mounted at the top of the motor housings of usual router devices.

The conventional router base 12 includes a cylindrical housing 16 which is open at each end, as indicated by the reference numerals 18 and 20. In order to incorporate a clamping means 22 in the router base 12, the housing 16 is formed with a shortened cylindrical wall 24 which extends from the opening 18 to a point intermediate the opening 20. The wall 24 is semi-circular in cross-section and is integrally formed with a corresponding semi-circular wall 26 which extends from opening 18 to opening 20. The walls 24 and 26 are separated by a narrow verticle slot 28 which forms a small separating space between walls 24 and 26. By forming the cylindrical housing 16 from a flexible material such as die cast aluminum, it is possible to apply a suitable force such as by clamping means 22, to bring together the vertical edges which define vertical slot 28, such that the router motor M can be rigidly held in position in the housing 16. To this end, the clamping means 22 is provided with a lateral arm 30 which is fixed to a lead-screw 32. The wall 24 is integrally formed with a laterally extending projection 34 which has a through bore for receiving the shank of lead-screw 32. The cylindrical wall 26 is formed with mounting columns 36, 38, and the column 36 is provided with an internally threaded bore which is aligned with the through bore in the projection 34. Thus, the lead-screw 32 can be inserted into the through bore of projection 34 and threadably engaged with the internal threads of the column 36, for bringing together the vertical edges of cylindrical walls 24 and 26 that define vertical slot 28. In this manner it is possible to tightly clamp the motor housing M after placing the cutting tool C in a given vertical position with respect to the cutting surface S.

At the lower end 20 of housing 16, there is mounted a substantially square base plate 40, which is attached to a shoulder 42 that extends inwardly from the wall 26. Also, the base plate 40 is provided with a central through bore 44 in order to provide clearance for the cutting tool C when the router 10 is in its operating position on the base 12. The plate 40 completely surrounds the cutting tool C. and is used in conventional router base arrangements for sliding the router along the cutting surface. In order to mount the base plate 40 on to the housing 16, aligned bores are formed in the guide attachment 14, the base plate 40, and the shoulder 42, as best seen in FIG. 1. Thus, by providing internal threads in the bores of shoulder 42, and externally threaded studs 45, it is possible to rigidly mount the guide attachment 14 and intermediate plate 40 on the housing 16.

The guide attachment 14 of the instant invention includes a support column 46 and sleeve column 48 which are spaced apart from each other and integrally formed with a handle plate 50 and sectored skid plate 52. The handle plate 50 is joined along the upper ends of support column 46 and sleeve column 48 and is generally shaped to conform to the quarter-sector of a circle. Thus, as seen in FIG. 2, the handle plate 50 has an outer radial portion 54 which extends axially beyond the housing 16 and skid plate 52, to provide a more than adequate means for the operator to grip the guide base 12. The columns 46 and 48 are both cylindrical in shape, with the support column 46 being preferably of a solid configuration to provide a rigid construction for the guide attachment 14, and with the sleeve column 48 being hollow and having a through bore 56 which extends from the handle plate 50 to the skid plate 52 to provide sufficient operating clearance for the cutting tool C. The handle plate 50 and skid plate 52 are provided with aligned circular openings 58 and 60, respectively, which communicate with through bore 56. A cylindrical wall 62 defines the clearance bore 56 and is provided with a clearance lip 64 which is formed along the bottom portion of sleeve column 48 that is joined to the skid plate 52. As best shown in FIG. 1, the clearance lip 64 extends along a segment of the periphery of sleeve column 48. The cylindrical wall 62 includes an outer, forward guide surface 66 which is directly above, and extends from, clearance lip 64 to handle plate 50.

By referring to FIG. 2, it can be seen that the handle plate 50 is in a substantially parallel position, overlying and coextensive with the skid plate 52. Although, the skid plate 52 is of the same general configuration as the handle plate 50, the skid plate 52 is of a smaller area than the handle plate 50 so as not to interfere with the gripping of handle plate 50. Accordingly, the skid plate 52 is defined by a top surface 68, bottom sliding surface 70 and peripheral edge 72. The peripheral edge 72 is bounded by two radii or guide edges 74, two side edges 76, and the included arc edge 78. It should be noted that the clearance bore 56 is located at the center point where the radii edges 74 come together. To facilitate the assembly of the guide attachment 14 to the base 12, skid plate 52 is provided with clearance holes 80 which are in alignment with the position of studs 45 to thereby provide free access for inserting a screw driver for mounting the handle plate 50 and base plate 40 on the housing 16.

In order to more fully appreciate the instant invention, a typical sequence of operation will now be described. Preparatory to cutting into the article of material A, it is necessary to accurately position the router 10 in the housing 16 with the leading edge of the cutter C extending beyond the sliding surface 70 of skid plate 52 at the exact cutting depth which is desired. By rigidly mounting the router 10 in the housing 16 through clamping means 22, it is possible to maintain a constant and accurate cutting depth. In operating the router 10, the sliding edge 70 of skid plate 52 is placed in a position coextensive with the cutting surface S. By providing the guide attachment 14 with a sectored configuration and construction, it is possible to bring the cutting tool C in close proximity to the template T, such that the guide attachment 14 is capable of being slid on the cutting surface S along, and in close proximity to, the outer peripheral edge P of the template T. Accurate cutting in accordance with the configuration of the template T is obtained by bringing the circular guide wall 66 into contact with the peripheral edge P of the template T. The guide wall 66 is particularly suitable for following curved or straight portions of the template. When the template is produced from a magnetic attracting metal, such as iron or steel, the skid plate 52 can be magnetized to thereby provide a means for attracting the guide attachment 14 to the peripheral edge P of the template T. In this manner it is possible to quickly and accurately move the guide attachment 14 along the various portions of template T. From the foregoing, it can be appreciated that the guide attachment 10 provides a means for bringing the cutting tool in the closest possible proximity to the outer periphery of a template in order to follow the configuration of the template without damaging the template by cutting into it with the cutting tool of the router.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What I claim is:

1. A guide attachment for use with a power operated router adapted to work a substantially flat cutting-surface along the outer periphery of a raised template which is placed in a position coextensive with said cutting surface, said router including a base for removably mounting said motor, and clamping means on said base for detachably securing said motor in a vertical orientation with respect to said cutting surface, said guide attachment comprising a sectored plate bounded by two radii edges extending radially from a center point and an included circular arc edge, means for maintaining said sectored plate in a spaced-apart and confronting position with respect to said base, and said sectored plate being formed with a through bore to provide operating clearance for said cutting tool, whereby said sectored plate is capable of being slid along said cutting surface to bring said cutting tool in close proximity to the outer peripheral edge of said raised template.

2. A guide attachment for use with a power operated router adapted to work a substantially flat cutting-surface along the outer periphery of a raised template which is placed in a position coextensive with said cutting surface, said router including a base for removably mounting said motor, a rotary cutting tool operatively connected to said motor, and clamping means on said base for detachably securing said motor in a vertical orientation with respect to said cutting surface, said guide attachment comprising a sectored plate bounded by two radii edges extending radially from a center point and an included circular arc edge, a column having an internal bore integrally formed with said sectored plate and extending upwardly therefrom for maintaining said sectored plate in a spaced-apart and confronting position with respect to said base, and said sectored plate being formed with a through bore communicating with said internal bore to provide operating clearance for said cutting tool, whereby said sectored plate is capable of being slid along said cutting surface to bring said cutting tool in close proximity to the outer peripheral edge of said raised template.

3. A guide attachment for use with a power operated router adapted to work a substantially flat cutting-surface along the outer periphery of a raised template which is placed in a position coextensive with said cutting surface, said router including a base for removably mounting said motor, a rotary cutting tool operatively connected to said motor, and clamping means on said base for detachably securing said motor in a vertical orientation with respect to said cutting surface, said guide attachment comprising a sectored plate bounded by two radii edges extending radially from a center point and an included circular arc edge, a column including a cylindrical wall defining an internal bore and said column being integrally formed on said sectored plate and extending upwardly therefrom for maintaining said sectored plate in a spaced-apart and substantially parallel confronting position with respect to said base, and said sectored plate being formed with a through opening communicating with said internal bore to provide operating clearance for said cutting tool, whereby said sectored plate is capable of being slid along said cutting surface with one of said radii edges and the outer forward surface edge of said cylindrical wall being brought into contact with the outer peripheral edge of said raised template such that said cutting tool is brought in close proximity to said template.

4. A guide attachment for mounting on a power operated router adapted to work a substantially flat cutting-surface along the outer periphery of a raised template which is placed in a position coextensive with said cutting surface, said router including a cylindrical housing for removably mounting said motor, a substantially flat base plate on said housing, means for attaching said base plate to said housing, a rotary cutting tool operatively connected to said motor, and clamping means on said housing for detachably securing said motor in a vertical orientation with respect to said cutting surface, said guide attachment comprising a sectored plate bounded by two radii edges extending radially from a center point and an included circular arc edge, a column including a cylindrical wall defining an internal bore and the lower end of said column being integrally formed on said sectored plate and extending upwardly therefrom, a flat handle plate integrally formed at the upper end of said column for mounting said sectored plate in a spaced-apart and confronting position with respect to said housing, said sectored plate and said handle plate being formed with aligned through openings communicating with said internal bore to provide operating clearance for said cutting tool, whereby said sectored plate is capable of being slid along said cutting surface with one of said radii edges and the outer forward surface edge of said cylindrical wall being brought into contact with the outer peripheral edge of said raised template such that said cutting tool is brought in close proximity to said template.

5. A guide attachment according to claim 4 in which said handle plate is in a substantially parallel position, overlying and coextensive, with respect to said sectored plate and the outer radial portion of said handle plate extends beyond said sectored plate and housing of the router.

6. A guide attachment according to claim 4 for use with a magnetic-attracting metallic template in which said sectored plate is magnetized for attracting said guide attachment to the peripheral edge of said template.

7. A guide attachment according to claim 4 in which said means for attaching said base plate include through openings on said base plate, internally threaded bores formed along the bottom of said housing in alignment with said openings, and threaded studs adapted to engage said internally threaded bores for securing said plate to said housing, and said handle plate is formed with through bores which are in alignment with said through openings and internally threaded bores such that said guide attachment can be mounted on said router with said studs.

References Cited

UNITED STATES PATENTS 3,717,013   9/1955   Van Zwalenburg __ 144—144 X

DONALD R. SCHRAN, *Primary Examiner.*